(12) United States Patent
Bindra et al.

(10) Patent No.: US 7,674,406 B2
(45) Date of Patent: Mar. 9, 2010

(54) CHEMILUMINESCENT COMPOSITIONS AND METHODS OF MAKING AND USING THEREOF

(76) Inventors: Perminder S. Bindra, 1 Fairway Club Dr., Fripp Island, SC (US) 29920; Andrew D Burris, 203 Scott St., Beaufort, SC (US) 29902; Carl R. Carlson, 81 Amy La., #5324, Ellijay, GA (US) 30540; Joann M Smith, 290 Vanilla La., Ellijay, GA (US) 30536; Orville Z Tyler, 4280 Pace St., Bldg 100, N. Charleston, SC (US) 29405; David L Watson, 121 Sea Otter La., Fripp Island, SC (US) 29920

( * ) Notice: Subject to any disclaimer, the term of this patent is extended or adjusted under 35 U.S.C. 154(b) by 0 days.

(21) Appl. No.: 11/763,084

(22) Filed: Jun. 14, 2007

(65) Prior Publication Data

US 2008/0308776 A1    Dec. 18, 2008

(51) Int. Cl.
*C09K 3/00* (2006.01)
(52) U.S. Cl. .......................... 252/700; 422/52; 422/61
(58) Field of Classification Search ................ 252/700; 422/52, 61
See application file for complete search history.

(56) References Cited

U.S. PATENT DOCUMENTS

| | | | |
|---|---|---|---|
| 3,539,794 A | 11/1970 | McKay | |
| 3,671,450 A | 6/1972 | Rauhut | |
| 3,775,336 A * | 11/1973 | Bollyky | 252/700 |
| 3,816,325 A | 6/1974 | Rauhut | |
| 4,626,383 A | 12/1986 | Richter | |
| 4,678,608 A * | 7/1987 | Dugliss | 252/700 |
| 4,814,949 A | 3/1989 | Elliott | |
| 5,043,851 A | 8/1991 | Kaplan | |
| 5,121,302 A | 6/1992 | Bay | |
| 5,122,306 A | 6/1992 | Van Moer | |
| 5,173,218 A | 12/1992 | Cohen | |
| 5,705,103 A | 1/1998 | Chopdekar | |
| 6,062,380 A | 5/2000 | Dorney | |
| 6,143,514 A * | 11/2000 | Ullman et al. | 435/28 |
| 6,251,581 B1 * | 6/2001 | Ullman et al. | 435/4 |
| 6,406,667 B1 * | 6/2002 | Singh et al. | 422/52 |
| 6,417,402 B1 * | 7/2002 | Das et al. | 564/307 |
| 7,189,406 B1 * | 3/2007 | Gross | 424/401 |
| 2003/0155560 A1 * | 8/2003 | Palmer et al. | 252/700 |
| 2003/0206971 A1 * | 11/2003 | McSherry et al. | 424/661 |
| 2005/0098766 A1 | 5/2005 | Watson, Jr. | |
| 2007/0020704 A1 * | 1/2007 | Wilhelm et al. | 435/7.21 |

\* cited by examiner

*Primary Examiner*—Douglas Mc Ginty
*Assistant Examiner*—Haidung D Nguyen
(74) *Attorney, Agent, or Firm*—Lawrence A. Villaneuva; Gardner Groff Greenwald & Villanueva, P.C.

(57) ABSTRACT

Described herein are chemiluminescent compositions that can be applied to a variety of substrates that are generally sensitive to existing chemiluminescent compositions. Methods for producing the chemiluminescent compositions are also provided.

26 Claims, No Drawings

CHEMILUMINESCENT COMPOSITIONS AND METHODS OF MAKING AND USING THEREOF

BACKGROUND

Chemiluminescent compositions generally utilize a two-component system to chemically generate light. The two components, which are usually in the form of chemical solutions, are referred to as the "activator" component and the "oxalate" component. The activator and oxalate are mixed together when chemiluminescent light is desired. The activator component includes a peroxide compound and a catalyst while the oxalate component includes an oxalate ester. The composition also includes a fluorescer, which may be present in either or both components. The chemiluminescent composition also includes a solvent or mixture of solvents for the activator component and a solvent for the oxalate component. The solvents for the two components may be different but are miscible with one another.

Chemiluminescent compositions typically are contained in devices in which the two components are kept physically separated prior to activation by a variety of methods. Often, the devices contain each component in separate chambers and when the production of chemiluminescent light is desired, a chamber is ruptured in a manner such that the two components are allowed to intermix. A popular example of this type of device is the "light stick." Here, a sealed frangible glass vial containing one component is housed within an outer flexible container containing the other component, which is also sealed. Flexing the outer container causes the vial to rupture, thereby releasing the component and allowing the two components to mix and produce light.

A general problem associated with chemiluminescent compositions is that they cannot be used on the human body. In general, the peroxide-containing compound is present in such large quantities that a relatively large amount of hydrogen peroxide is generated in the chemiluminescent system. If the chemiluminescent composition comes into contact with human hair, human skin, or other articles that are subject to degradation by oxidation, the chemiluminescent compositions will have an oxidizing and/or bleaching effect that is undesirable and potentially harmful.

Thus, what is lacking in the prior art is a chemiluminescent composition and a production process for creating self-illuminating compositions such as, for example, gels, that can be applied to the human body, hair, or other substrates sensitive to oxidation.

SUMMARY OF EMBODIMENTS

Described herein are chemiluminescent compositions that can be applied to a variety of substrates that are generally sensitive to existing chemiluminescent compositions. Methods for producing the chemiluminescent compositions are also provided. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not. For example, the phrase "optionally substituted lower alkyl" means that the lower alkyl group can or cannot be substituted and that the description includes both unsubstituted lower alkyl and lower alkyl where there is substitution.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Described herein are chemiluminescent compositions and methods of making and using thereof. In one aspect, the chemiluminescent composition is produced by the process comprising mixing:

a. an activator comprising (i) a solvent comprising water and at least one organic solvent, (ii) an oxidant, and (iii) a plasticizer, a thickener, a chelating agent, a buffering agent, a catalyst, or any combination thereof; with b. a luminescer comprising an oxalate compound and a fluorescer, wherein the composition does not contain a granular material.

The activator and luminescer are described in detail below. The activator includes a solvent comprising water and at least one organic solvent. The chemiluminescent compositions are predominantly water-based compositions. The additional organic solvent is used to facilitate dissolving other solids in the activator. Additionally, the organic solvent can be used as a thickening agent. In one aspect, the organic solvent comprises a polyol. The term "polyol" is defined herein as a compound with two or more hydroxyl groups. Examples of polyols useful herein include, but are not limited to, glycerin and polyethylene glycol. The amount of solvent can vary depending upon the components selected to produce the activator. In one aspect, the amount of water is from 40 to 85%, 45 to 80%, or 50 to 70% by weight of the activator. In another aspect, the organic solvent is from 0.5 to 20% or 1 to 15% by weight of the activator.

The activator includes an oxidant. The function of the oxidant will be discussed below. In general, the oxidant is any compound that can react (i.e., oxidize) the oxalate in the luminescer. In one aspect, the oxidant comprises hydrogen peroxide. In another aspect, the oxidant comprises a hydrogen peroxide precursor. The term "hydrogen peroxide precursor" as used herein is defined as any compound that produces hydrogen peroxide in situ. For example, the hydrogen peroxide precursor can react with water to produce hydrogen peroxide. Examples of hydrogen peroxide precursors include, but are not limited to, urea peroxide, hydrogen peroxide, sodium peroxide, sodium perborate, sodium pyrophosphate peroxide, or any combination thereof. The oxidants disclosed in U.S. Pat. Nos. 3,539,794 and 5,705,103, which are incorporated by reference in their entireties, can be used herein. In one aspect, the amount of oxidant is from 2 to 20%, 5 to 15%, or 5 to 10% by weight of the activator.

The activator includes a plasticizer, a thickener, a chelating agent, a buffering agent, a catalyst, or any combination thereof. In one aspect, the activator includes a plasticizer, a thickener, a chelating agent, a buffering agent, and a catalyst. Each component is described in detail below.

In one aspect, the plasticizer comprises a phthalate, an adipate, a trimellitate, a sebacate, a benzoate, an organophosphate, a sulfonamide, a citrate, a vinyl halide, a vinylidene halide, or any combination thereof. In another aspect, the plasticizer comprises a dialkyl phthalate. The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms. In one aspect, the plasticizer is dimethyl phthalate. In one aspect, the amount of plasticizer is from 0.5 to 10% or 1 to 5% by weight of the activator.

The thickener generally includes a water-swellable polymer. The water swellable-polymers disclosed in U.S. Pat. No. 3,816,325, which are incorporated by reference in their entirety, can be used herein as a thickener. In one aspect, the thickener can include a hydrogel. Examples of thickeners useful herein include, but are not limited to, carboxymethylcellulose and or a salt thereof, hydroxyethylcellulose, methylcellulose, hydroxypropylmethylcellulose, or any combination thereof. In one aspect, the amount of thickener is less than 5%, less than 3%, or less than 1% by weight of the activator.

In one aspect, the chelating agent comprises a polyamine or the salt thereof. The term "polyamine" as used herein is defined as any compound that possesses two or more substituted or unsubstituted amino groups (mono-, di, -tri-, or quaternary). In one aspect, the chelating agent comprises disodium EDTA. In another aspect, the amount of chelating agent is less than 5%, less than 3%, or less than 1% by weight of the activator.

In one aspect, the buffering agent comprises an alkyl amine, an alkanol amine, a quaternary amine, or any combination thereof. In another aspect, the buffering agent comprises triethanolamine, trimethanolamine, or a combination thereof. In another aspect, the amount of buffering agent is less than 5%, less than 3%, or less than 1% by weight of the activator.

The use of a catalyst can enhance the quantum yield of the chemiluminescent reaction. The catalysts disclosed in U.S. Pat. Nos. 3,539,794 and 5,705,103, which are incorporated by reference in their entireties, can be used herein. In one aspect, the catalyst comprises a quaternary ammonium compound, quaternary arsenic compound, or a quaternary phosphorous compound. In another aspect, the catalyst comprises a benzyltrialkyl ammonium compound or a salicylate salt. As will be discussed below, the nature and amount of catalyst used can affect the duration and intensity of the chemiluminescent reaction. In one aspect, the amount of catalyst is from 0.5 to 10% or 1 to 5% by weight of the activator.

Turning the luminescer, the oxalate compound can be a substituted or unsubstituted alkyl or aryl oxalate ester or salt thereof. The term "aryl group" as used herein is any carbon-based aromatic group including, but not limited to, benzene, naphthalene, etc. The term "aryl" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy. The term "alkyl" is defined above.

In one aspect, the oxalate compound is a solid that can be finely ground into a powder. This will ensure that the oxalate is uniformly distributed throughout the activator. In one aspect, the amount of oxalate compound is from 1 to 10%, 5 to 10%, or 7 to 8% by weight of the luminescer. In one aspect, the oxalate compound comprises bis-(2,4,5-trichlorophenyl)-6-carbopentoxyphenyl)oxalate (CPPO) or bis-(2,4,5-trichlorophenyl)oxalate (TCPO).

The second component of the luminescer includes a fluorescer. Suitable fluorescers have spectral emissions in the visible range (between 330 nm and 700 nm) and in the infrared range (between 700 nm and 1000 nm). The wavelength of the light emitted, i.e., the color of the light emitted, by the chemiluminescent compositions can vary depending upon the particular fluorescer employed. In one aspect, the fluorescers in Table 1 that emit light of the four primary colors of the visible spectrum can be used herein.

TABLE 1

| Color | Fluorescer |
| --- | --- |
| Yellow | 2-chloro-9.10-bis(4-ethoxyphenyl)anthracene; 1,5-dichloro-9,10-bis(phenylethynyl)anthracene and 1,8-dichloro-9,10-bis(phenylethynyl)anthracene |
| Red | 1,7-dibromo-6,12-diphenoxy-N,N'-bis(2-isopropylphenyl)-3,4,9,10-perylenedicarboximide; 1,6,7,12-tetraphenoxy-N,N'-diethyl-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(o-fluorophenoxy)-N,N'-bis(2,6-diisopropylphenyl)-3,4,9,10-perylenedicarboximide; 1,6,7,12-tetra(o-chlorophenoxy)-N,N'-bis(2,6-diisopropylphenyl)-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(p-t-butylphenoxy)-N,N'-bis(2,6-diisopropylphenyl)-3,4,9,10-perylenedicarboximide; 1,6,7,12-tetraphenoxy)-N,N'-di-neopentyl-3,4,9,10-perylenedicarboximide; 1,6,7,12-tetra(p-bromohenoxy)-N,N'-bis(2,6-diisopropylphenyl)-3,4,9,10-perylenedicarboximide; 1,6,7,12-tetraphenoxy-N,N'-bis(2,5-di-t-butylphenyl)-3,4,9,10-perylenedicarboximide; 1,6,7,12-tetraphenoxy-N,N'-bis(2,6-diisopropylphenyl)-3,4,9,10-perylenedicarboximide; |
| Blue | 2-chloro-9.10-bis(4-ethoxyphenyl)anthracene; 1-chloro-9.10-bis(4-ethoxyphenyl)anthracene |
| Green | 9,10-bis(phenylethynyl)anthracene; 2-ethyl-9,10-bis(phenylethynyl)anthracene; 2-chloro-9.10-bis(4-methoxyphenyl)anthracene; 1-chloro-9.10-bis(phenylethynyl)anthracene |
| Orange | 5,6,11,12-tetraphenylnaphthacene |

Examples of fluorescers that emit light in the IR include, but are not limited to, N,N'-bis(2,5,-di-tert-butylphenyl)-3,4,9,10-perylenedicarboximide, 16,17-butyloxyviolanthrone; 1-N,N-dibutylaminoabnthracene; or 6-methylacridinium iodide.

In certain aspects, it is desirable to obtain a variety of different fluorescent colors for which a suitable fluorescer is not available. It is contemplated that two or more fluorescers can be used simultaneously in the compositions described herein to achieve specific colors. The selection of particular fluorescers and their relative concentrations can produce a variety of different colors. Table 2 lists some possible combinations of fluorescers that emit light for the following colors: orange, pink, purple, turquoise and white.

TABLE 2

| Color/Dye | Trade/other name of the fluorescent compound |
|---|---|
| Green | 9,10-bis(phenylethynyl)anthracene |
| Yellow | 1,8-dichloro-9,10-bis(phenylethynyl)anthracene |
| Red | N,N'-bis(2,5,-di-tert-butylphenyl)-3,4,9,10-perylenedicarboximide |
| Blue | 2-chloro-9,10-bis(4-ethoxyphenyl)anthracene |
| Orange | 2-methyl-1-anthraquinonylamine |
| Pink | Combination of Red and Blue dyes |
| Purple | Combination of Red and Blue dyes |
| Turquoise | Combination of Green and Blue dyes |
| White | Combination of Red, Yellow and Blue dyes |
| Infrared | 16,17-butyloxyviolanthrone |

In one aspect, the fluorescer is a solid that can be finely ground into a powder. Similar to the oxalate compound, this will ensure that the fluorescer is uniformly distributed throughout the activator.

Neither the activator nor luminescer contain a granular material. "Granular" as used herein means a material that comprises small solid particles of crystalline structure, wherein the particles are either (1) insoluble or sparingly soluble in any of the liquid component(s) of the chemiluminescent system, or (2) if soluble in the liquid component(s), the liquid components are present in, an insufficient quantity to solubilize a substantial portion of the particles, or (3) the liquid component(s) are in a form that will not materially solubilize the particles, such as a thickener. For example, if the liquid is thickened prior to introduction of the particles, the liquid component is not in a form that will materially solubilize the granular particles. The compositions described herein are homogeneous in the sense that they are uniform and do not contain solid particulates or crystals described above.

The preparation of the chemiluminescent compositions is described below. The different components of the activator are mixed with one another in various sequences to produce a homogeneous composition. In one aspect, the solvent and thickener are mixed first, followed by the addition of the following components in order: the catalyst, the plasticizer, the chelating agent, the oxidant, and the buffering agent. In another aspect, the solvent and thickener are mixed first, followed by the addition of the following components in order: the catalyst, the oxidant, an emulsifier, the plasticizer, and the chelating agent. The components are mixed for a sufficient time and temperature to produce a homogeneous mixture. For example, the ingredients used to produce the activator can be introduced into a homogenizer to produce a gel. In the case when the chemiluminescent composition is a topical composition (e.g., placed upon the skin or hair), additional components such as skin conditioners, hair conditioners, and perfumes can be incorporated into the activator prior to the addition of the luminescer.

The components present in the activator and luminescer react with one another upon mixing to produce visible or infrared light. Not wishing to be bound by theory, the oxidant (e.g., $H_2O_2$) reacts with the oxalate compound to produce a very highly reactive cyclic peroxy species. This species then excites the fluorescer. The excited fluorescer emits a photon (i.e., radiates the energy) then returns to the stable ground state. The color of the emitted light depends on the frequency in the visible spectrum range at which the photon is emitted from the fluorescer.

The reaction rate between the components of the activator and luminescer, which determines the intensity and duration of glow, can be modified by controlling the rate of diffusion of, among other things, the oxidant, the oxalate compound, and the fluorescer in the chemiluminescent composition. For example, by adjusting the concentration of the solvents, plasticizers, thickeners, and chelating agents, the glow intensity and duration can be specifically controlled. Thus, the compositions described herein can emit colored light from 1 hour up to 12 hours.

In general, prior to using the chemiluminescent composition, the activator and the luminescer are kept in separate packages, where the packages do not permit air to enter and react with the components of the activator and luminescer. For example, the activator and luminescer can be placed in separate hermitically sealed aluminum foil bubble packs to maintain the shelf-life of the activator and luminescer. When it is time to use the chemiluminescent composition, the activator is released from the package into an open container, and the luminescer, which is preferably a powder, is admixed with the activator by vigorous stirring. Thus, the reaction proceeds in the open air, which is not the case with prior art chemiluminescent compositions.

Because the compositions described herein generally do not use objectionable organic solvents that have odor and staining properties, the compositions described herein can be applied to numerous substrates. Moreover, the compositions are much less toxic. As described above, the compositions can be applied topically to skin or hair. Alternatively, the compositions can be applied to articles of clothing or other substrates.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Tables 3 and 4 provide the ingredients for producing the activator and luminescer, respectively. Table 5 lists the sequence for producing a high-glow intensity, short time duration chemiluminescent gel. The mixing process is carried out in several steps in a stainless steel apparatus to ensure that a homogeneous gel is formed.

To make the homogeneous gel, the solvents of sequence 1 were added to the stainless steel apparatus with an in-built homogenizer and heated to about 35° C. at an RPM of 2,000-2,500 to ensure total mixing. As soon as this mixture was cooled to room temperature, sequence 2 was added in increments to avoid clumping. Sequence 3 ingredients were then added, one at a time, with adequate stirring, i.e., 2,000-2,500 RPM. This is followed by the addition of sequence 4 ingredients, which were also added one at a time. Agitation was maintained until a homogeneous gel was formed. Finally, the buffering sequence 5 was added to the gel under sweep agitation and adjusting the mixing speed until the gel was neutralized and uniform.

Sequence 6 is the luminescer. A powdered form of CPPO and the fluorescer were mixed and ground to a finer powder. The luminescer powder was then added to the activator gel above and agitated under quality control conditions to validate the reaction time and color. A high intensity glow was observed immediately which lasted for as much as 6 hours.

TABLE 3

Concentration ranges and the ingredients for the high intensity glow activator gel with glow times ranging from 4 to 6 hours

| No. | INCI Name | Function | CAS No. | Conc. (w %) |
|---|---|---|---|---|
| 1 | Aqua | Solvent | 7732-18-5 | 50-75 |
| 2 | PEG-400 | Humectant/solvent | 25322-68-3 | 1-5 |
| 3 | Glycerin | Humectant/solvent | 56-81-5 | 5-10 |
| 4 | Carbomer-940 | Skin conditioner | 9003-01-4 | <1 |
| 5 | Triethanolamine | Buffer | 102-71-6 | <1 |
| 6 | Benzyltriethyl-ammonium chloride | Antistatic/catalyst | 56-37-1 | <1 |
| 7 | PVP K90 | Hair fixer/hardening agent | 9003-39-8 | 1-5 |
| 8 | Urea peroxide | Oxidizer | 124-43-6 | 5-10 |
| 9 | Dimethyl phthalate | Solvent/plasticizer | 131-11-3 | 1-5 |
| 10 | Disodium EDTA | Chelating/viscosity controlling | 6381-92-6 | <1 |
| 11 | Hydroxyethyl-cellulose | Thickener | 9004-62-0 | <1 |
| Total | | | | 75-100 |

TABLE 4

Concentration ranges of the ingredients in the Luminescer powder

| No. | Trade/other name | Function | CAS No. | Conc. (w %) |
|---|---|---|---|---|
| | Fluorescer | Dye | | 0.2-0.3 |
| | Bis-(2,4,5-trichloro-phenyl)-6-carbo-pentoxyphenyl)oxalate (CPPO) | Chemiluminescent compound | 30431-54-0 | 5-10 |
| Total | | | | 5-10 |

TABLE 5

Sequencing for the ingredients of the high-intensity glow gel with glow times ranging from 4 to 6 hours

| Sequence No. | Ingredients |
|---|---|
| 1 | Water, Glycerin, PEG-400, Hydroxycellulose |
| 2 | Carbomer-940 |
| 3 | Benzyltriethylammoinium chloride, Dimethyl phthalate, Disodium EDTA, Urea peroxide |
| 4 | PVP K90, Fragrance (Manheimer 874072) |
| 5 | Triethanolamine |
| 6 | Fluorescer, CPPO |

Example 2

Table 7 lists the sequence for producing a low-glow intensity, long time duration chemiluminescent gel. Table 6 provides the ingredients for producing the activator. The fluorescer in Table 4 was used. The homogeneous gel was made by first adding the solvents of sequence 1 to the stainless steel apparatus with an in-built homogenizer and heated to about 35° C. at an RPM of 2000-2,5000 to ensure total mixing. When the mixture cooled down to room temperature, sequence 2 was added in increments to avoid clumping. Sequence 3 ingredients were then added, one at a time, with adequate stirring, i.e., 2000-2,500 RPM. This was followed by sequence 4 ingredients, also added one at a time, and the agitation was maintained until a homogeneous gel was formed. The buffering mixture of sequence 5 was then added to the gel under sweep agitation and adjusting the mixing speed until the gel was neutralized and uniform.

Sequence 6 is the luminescer. A powdered form of CPPO and the fluorescer were mixed and ground to much finer powder. The luminescer powder was then added to the activator gel produced above and agitated under quality control conditions to validate the reaction time and color. A relatively high intensity glow was observed immediately which lasted for as much as 18 hours.

TABLE 6

Concentration ranges and the ingredients for the low glow intensity Activator gel with glow times ranging from 8 to 12 hours

| No. | INCI Name | Function | CAS No. | Conc. (w %) |
|---|---|---|---|---|
| 1 | Aqua | Solvent | 7732-18-5 | 50-75 |
| 2 | PEG-400 | Humectant/solvent | 25322-68-3 | 1-5 |
| 3 | Glycerin | Humectant/solvent | 56-81-5 | 5-10 |
| 4 | Carbomer-940 | Skin conditioner | 9003-01-4 | <1 |
| 5 | Sodium salicylate | Catalyst | 1344-09-8 | 1-5 |
| 6 | Dodecyl benzene sulfonate | Emulsifier | 1886-81-3 | <1 |
| 7 | PVP K90 | Hair fixer/hardening agent | 9003-39-8 | 1-5 |
| 8 | Urea peroxide | Oxidizer | 124-43-6 | 5-10 |
| 9 | Dimethyl phthalate | Solvent/plasticizer | 131-11-3 | 1-5 |
| 10 | Disodium EDTA | Chelating/viscosity controlling | 6381-92-6 | <1 |
| 11 | Hydroxyethylcellulose | Thickener | 9004-62-0 | <1 |
| Total | | | | 75-100 |

TABLE 7

Sequencing for the ingredients of the low-intensity glow gel
with glow times ranging from 8 to 12 hours

| Sequence No. | Ingredients |
| --- | --- |
| 1 | Water, Glycerin, PEG-400, Hydroxyethylcellulose |
| 2 | Carbomer-940 |
| 3 | Sodium salicylate, Urea peroxide, Dodecyl benzene sulphonate |
| 4 | PVP K90, Fragrance (Manheimer 874072) |
| 5 | Dimethyl phthalate, Disodium EDTA, |
| 6 | Fluorescer, CPPO |

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A topical chemiluminescent composition produced by the process consisting of mixing:
   a. an activator, wherein the activator is a mixture of (i) a solvent that is a mixture of water and at least one organic solvent, (ii) an oxidant, and (iii) a compound selected from the group consisting of a plasticizer, a thickener, a chelating agent, a buffering agent, a catalyst, or any combination thereof; with
   b. a luminescer, wherein the luminescer is a mixture of an oxalate compound and a fluorescer,
wherein the topical composition does not contain a granular material and is homogeneous, and wherein the composition is self-illuminating upon admixing the activator with the luminescer.

2. The composition of claim 1, wherein the organic solvent is a polyol.

3. The composition of claim 1, wherein the organic solvent is polyethylene glycols and glycerin.

4. The composition of claim 1, wherein the oxidant is hydrogen peroxide or a hydrogen peroxide precursor.

5. The composition of claim 1, wherein the oxidant is urea peroxide, hydrogen peroxide, sodium peroxide, sodium perborate, sodium pyrophosphate peroxide, or any combination thereof.

6. The composition of claim 1, wherein the plasticizer is a phthalate, an adipate, a trimellitate, a sebacate, a benzoate, an organophosphate, a sulfonamide, a citrate, a vinyl halide, a vinylidene halide, or any combination thereof.

7. The composition of claim 1, wherein the plasticizer is a dialkyl phthalate.

8. The composition of claim 1, wherein the thickener is a hydrogel.

9. The composition of claim 1, wherein the thickener is carboxymethylcellulose and or a salt thereof, hydroxyethylcellulose, methylcellulose, hydroxypropylmethylcellulose, or any combination thereof.

10. The composition of claim 1, wherein the chelating agent is a polyamine or the salt thereof.

11. The composition of claim 1, wherein the chelating agent is disodium EDTA.

12. The composition of claim 1, wherein the buffering agent is an alkyl amine, an alkanol amine, a quaternary amine, or any combination thereof.

13. The composition of claim 1, wherein the buffering agent is triethanolamine, trimethanolamine, or a combination thereof.

14. The composition of claim 1, wherein the catalyst is a quaternary ammonium compound, quaternary arsenic compound, or a quaternary phosphorous compound.

15. The composition of claim 1, wherein the catalyst is a benzyltrialkyl ammonium compound or a salicylate salt.

16. The composition of claim 1, wherein the activator is a gel.

17. The composition of claim 1, wherein the oxalate compound is a substituted or unsubstituted aryl or alkyl oxalate ester.

18. The composition of claim 1, wherein the oxalate compound is bis-(2,4,5-trichlorophenyl)-6-carbopentoxyphenyl) oxalate (CPPO) or bis-(2,4,5-trichlorophenyl)oxalate (TCPO).

19. The composition of claim 1, wherein the fluorescer is 2-chloro-9,10-bis(4-ethoxyphenyl)anthracene; 1,5-dichloro-9,10-bis(phenylethynyl)anthracene and 1,8-dichloro-9,10-bis(phenylethynyl)anthracene; Rubrene; 1,7-dibromo-6,12-diphenoxy-N,N'-bis(2-isopropylphenyl)-3,4,9,10-perylenedicarboximide; 1,6,7,12-tetraphenoxy-N,N'-diethyl-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(o-fluorophenoxy)-N,N'-bis(2,6-diisopropylphenyl)-3,4,9,10-perylenedicarboximide; 1,6,7,12-tetra(o-chlorophenoxy)-N,N'-bis(2,6-diisopropylphenyl)-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(p-t-butylphenoxy)-N,N'-bis(2,6-diisopropylphenyl)-3,4,9,10-perylenedicarboximide; 1,6,7,12-tetraphenoxy)-N,N'-di-neopentyl-3,4,9,10-perylenedicarboximide; 1,6,7,12-tetra(p-bromohenoxy)-N,N'-bis(2,6-diisopropylphenyl)-3,4,9,10-perylenedicarboximide; 1,6,7,12-tetraphenoxy-N,N'-bis(2,5-di-t-butylphenyl)-3,4,9,10-perylenedicarboximide; 1,6,7,12-tetraphenoxy-N,N'-bis(2,6-diisopropylphenyl)-3,4,9,10-perylenedicarboximide; 2-chloro-9,10-bis(4-ethoxyphenyl)anthracene; 1-chloro-9,10-bis(4-ethoxyphenyl)anthracene; 9,10-bis(phenylethynyl)anthracene, or a combination thereof.

20. The composition of claim 1, wherein the fluorescer emits light in the IR region.

21. The composition of claim 20, wherein the fluorescer is N,N'-bis(2,5,-di-tert-butylphenyl)-3,4,9,10-perylenedicarboximide; 16,17-butyloxyviolanthrone; 1-N,N-dibutylaminoabnthracene; or 6-methylacridinium iodide.

22. The composition of claim 1, wherein the luminescer is a powder.

23. A topical chemiluminescent composition consisting of a mixture of
   a. an activator, wherein the activator is a mixture of (i) a solvent that is a mixture of water and at least one organic solvent, (ii) an oxidant, and (iii) a compound selected from the group consisting of a plasticizer, a thickener, a chelating agent, a buffering agent, a catalyst, or any combination thereof; and
   b. a luminescer, wherein the luminescer is a mixture of an oxalate compound and a fluorescer, wherein the topical composition does not a contain a granular material and is homogeneous, and wherein the composition is self illuminating upon admixing the activator with the luminescer.

24. A method for producing the topical chemiluminescent composition of claim 23 consisting of mixing:
  a. an activator, wherein the activator is a mixture of (i) a solvent that is a mixture of water and at least one organic solvent, (ii) an oxidant, and (iii) a compound selected from the group consisting of a plasticizer, a thickener, a chelating agent, a buffering agent, a catalyst, or any combination thereof; with
  b. a luminescer, wherein the luminescer is a mixture of an oxalate compound and a fluorescer, wherein the topical composition does not a contain a granular material and is homogeneous, and wherein the composition is self illuminating upon admixing the activator with the luminescer.

25. A kit consisting of
  a. an activator, wherein the activator is a mixture of (i) a solvent that is a mixture of water and at least one organic solvent, (ii) an oxidant, and (iii) a compound selected from the group consisting of a plasticizer, a thickener, a chelating agent, a buffering agent, a catalyst, or any combination thereof; and
  b. a luminescer, wherein the luminescer is a mixture of an oxalate compound and a fluorescer, wherein the activator and the luminescer do not a contain a granular material and is homogeneous upon mixing to produce a topical composition, and wherein the composition is self-illuminating upon admixing the activator with the luminescer.

26. A composition consisting of the topical chemiluminescent composition of claim 1 and a component selected from the group consisting of a skin conditioner, a hair conditioner, and a perfume.

* * * * *